A. C. RUDEN.
DIFFERENTIAL GEARING.
APPLICATION FILED APR. 21, 1917.

1,254,540.

Patented Jan. 22, 1918.
3 SHEETS—SHEET 1.

WITNESSES

INVENTOR
A. C. Ruden,
BY Victor J. Evans
ATTORNEY

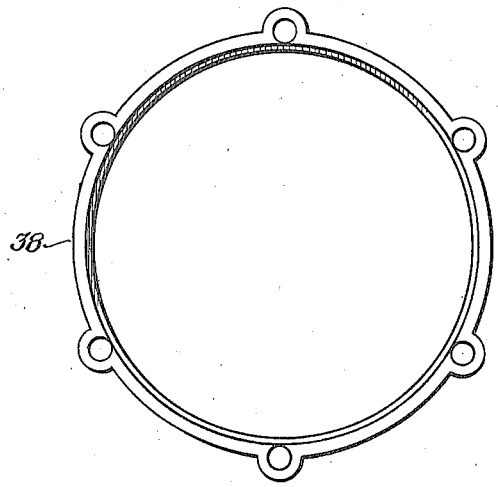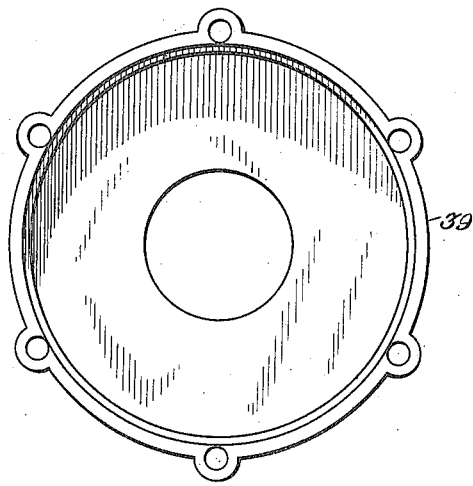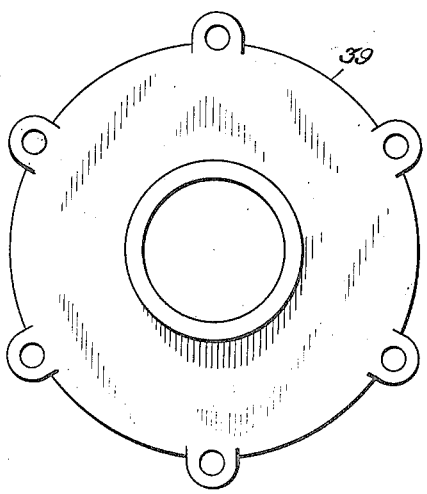

UNITED STATES PATENT OFFICE.

ARTHUR C. RUDEN, OF EAST CLEVELAND, OHIO.

DIFFERENTIAL GEARING.

1,254,540. Specification of Letters Patent. Patented Jan. 22, 1918.

Application filed April 21, 1917. Serial No. 163,695.

*To all whom it may concern:*

Be it known that I, ARTHUR C. RUDEN, a citizen of the United States, residing at East Cleveland, in the county of Cuyahoga and State of Ohio, have invented new and useful Improvements in Differential Gearings, of which the following is a specification.

This invention relates to differential gearing, the same being especially designed for use in connection with the driving mechanism of motor vehicles.

The object of the present invention is to do away with the toothed gearing now employed in the present day automobile practice and in which the gears are always liable to have the teeth thereof stripped by undue and excessive strains, and to substitute in lieu thereof novel clutch mechanism which automatically compensates for any difference in the ratio of speed between the two driving wheels of the vehicle or the sections of the shaft which are used as elements in transmitting motion from the engine shaft to the driving wheels of the vehicle.

A further object of the invention is to provide differential gearing of the general character hereinabove referred to which will operate either when the machine is traveling in a forward or backward direction.

By means of the differential gearing hereinafter described and herein illustrated, both wheels are positively driven when the machine is moving in a straightaway direction and not making a turn. The gearing therefore provides for the positive driving of both of the driving wheels when it is necessary to extricate a motor vehicle from a mired or difficult position under its own power.

With the above and other objects in view, the invention consists in the novel construction, combination and arrangement of parts, herein described, illustrated and claimed.

In the accompanying drawings:—

Fig. 10 is a face view of the central section of the housing.

Fig. 11 is an inside face view of one of the end sections of the housing.

Fig. 12 is an outside face view of the same.

Figure 1:
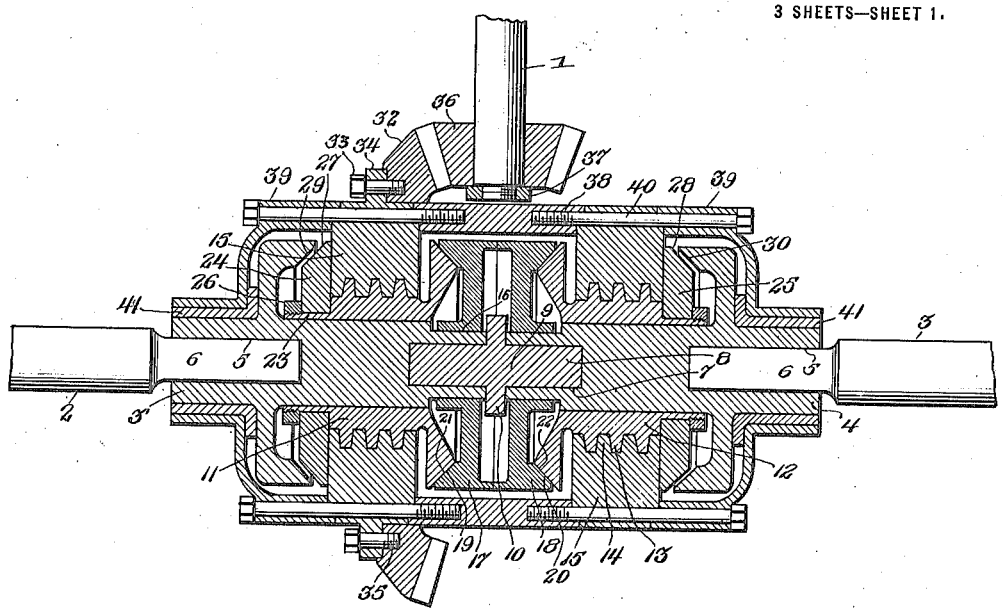
Figure 1 is a central diametrical section through the improved differential gearing, showing a portion of the driving shaft, and portions of the driven shaft or driving axles.
Figures 2, 3, 4:
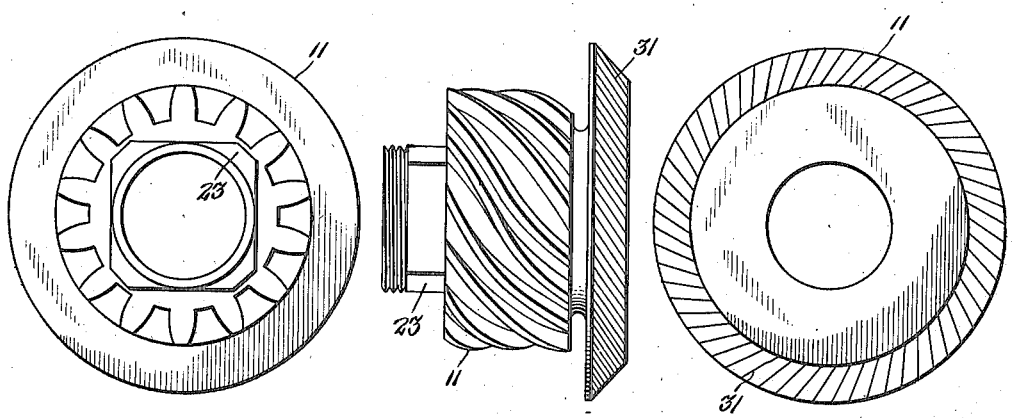
Fig. 2 is a detail view of one of the spiral gears and clutch members.
Fig. 3 is a view looking toward the clutch face of said spiral gear.
Fig. 4 is a view of the same looking in the opposite direction.
Figure 5:
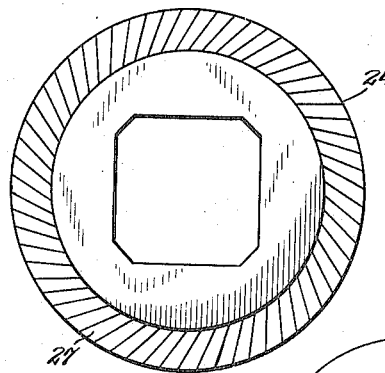
Fig. 5 is a face view of one of the central clutch members.
Figure 6:
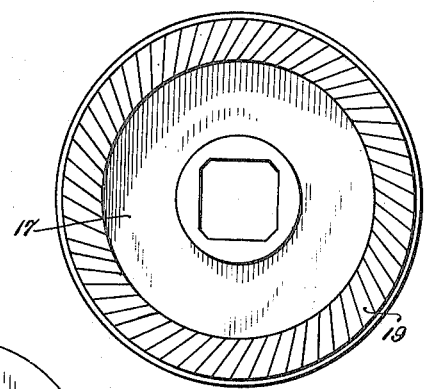
Fig. 6 is a face view of one of the clutch members at the outer end of the respective spiral gear.
Figure 9:
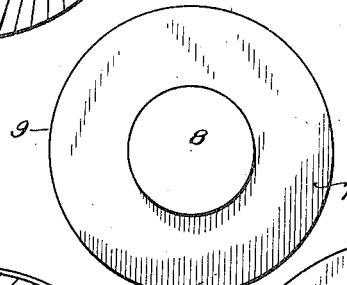
Fig. 9 is an end view of the center support for the countershafts.
Figure 7:
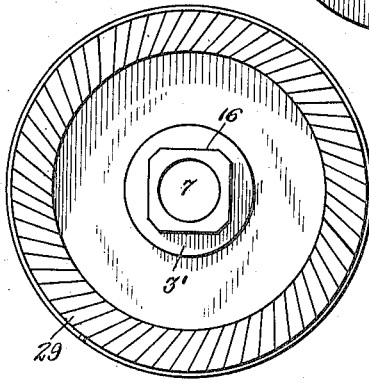
Fig. 7 is an inside face view of one of the clutch members on the respective countershaft.
Figure 8:
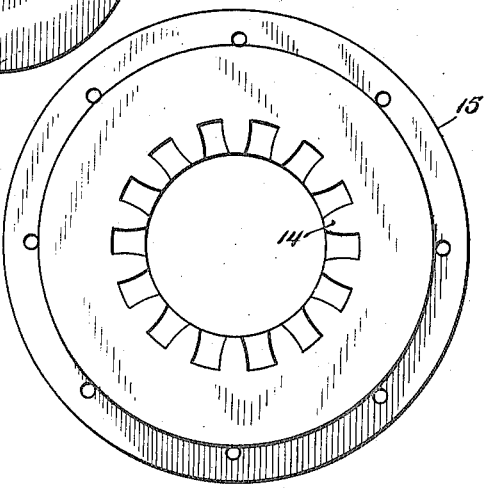
Fig. 8 is a face view of one of the internal gears.

Referring to the drawings 1 designates the drive shaft of a motor vehicle, the same constituting and being hereinafter referred to as the driving shaft of the differential gearing. 2 and 3 designate the driving axle sections, the same constituting and being hereinafter referred to as the driven shaft or the driven shaft sections. The parts 1, 2 and 3 correspond with the similar parts now commonly employed in the present day automobile practice.

In carrying out the present invention, I employ two countershaft sections 3' and 4 each of which is formed with a central bore 5 of non-circular shape in cross section to receive the correspondingly shaped end portion 6 of the respective driven shaft section 2 or 3 as the case may be, the parts 3' and 2 or 4 and 3 rotating as one. Each of the countershaft sections 3' and 4 is formed in the inner end thereof with a central smooth round bore 7 to receive the opposite ends 8 of a center supporting shaft 9 having a central circumferential flange 10 which lies in abutting relation to and between the inner extremities of the countershaft sections 3' and 4 as shown in Fig. 1. The center shaft 9 forms alining and bracing means between the adjacent ends of the countershaft sections 3' and 4 and also as a stop for limiting the movements of the centrally arranged clutch members hereinafter referred to.

Surrounding the countershaft sections 3' and 4 are spiral gears 11 and 12, each gear having spirally disposed teeth 13 which mesh with the corresponding spirally disposed teeth 14 of internal gears 15, there being two of such gears 15 equidistant from the center of the differential gearing as a whole. The portion of each countershaft section 3' and 4 which is surrounded by the respective spiral gear is smooth so as to admit of a relative rotative movement between said parts.

The inner ends of the countershafts 3' and 4 are reduced and squared as shown at 16 to receive a pair of centrally located clutch members 17 and 18, the hubs of which are bored to correspond with the cross sectional shape of the ends of the countershaft sections upon which they are mounted. Therefore each of the clutch members 17 and 18 rotates with the respective countershaft section but is capable of a limited amount of sliding movement longitudinally thereof for a purpose which will hereinafter appear. The clutch member 17 is formed with a beveled clutch face 19 and the clutch member 18 is formed with a corresponding beveled clutch face 20. The spiral gear 11 is formed with a clutch face 21 adapted to coöperate with the clutch face 19, and the spiral gear 12 is formed with a clutch face 22 adapted to coöperate with the clutch face 20.

The outer end portions of the spiral gears 11 and 12 are reduced and preferably squared as shown at 23 and have fitted thereon clutch members 24 and 25 which always rotate with the respective spiral gears and are secured in fixed relation thereto by means of nuts 26. The clutch member 24 comprises a beveled clutch face 27 and the clutch member 25 comprises a beveled clutch face 28. The countershaft section 3' is formed with a beveled clutch face 29 adapted to coöperate with the clutch face 27, and the countershaft section 4 is formed with a beveled clutch face 30 adapted to coöperate with the clutch face 28. All of the clutch faces hereinabove described are preferably grooved, serrated or otherwise roughened as indicated for example at 31 in some of the detail views, thereby to obtain a better grip, one upon another. Any suitable expedient may however be resorted to for obtaining the necessary gripping and clutching action between the clutch faces so as to prevent undue slippage in actual operation.

One of the internal gears 15 is surrounded by a ring gear 32 which is shown as formed separately from said internal gear and secured thereto by fastening means 33 shown in the form of bolts or cap screws which are inserted through lugs 34 on the periphery of said internal gear and into threaded sockets 35 in the ring gear. The gear 32 meshes with and is driven by the usual pinion 36 fast on the adjacent extremity of the drive shaft 1, 37 designating a nut for securing the pinion 36 to the shaft 1.

The differential gearing also comprises, in the preferred embodiment thereof, a sectional housing. Said housing comprises a central section 38 which is interposed between the internal gears 15, and end sections 39 arranged at the outer sides of said internal gears. All of the housing sections are secured in fixed relation to each other and to the internal gears 15 by means of assembly bolts 40. Bushings 41 are inserted between the outer end portions of the countershafts 3' and 4 and the end sections 39 of the housing.

The operation of the differential gearing is as follows: The driving shaft 1 imparts rotary motion to the pinion 36 which in turn imparts motion to the ring gear 32. This imparts rotary motion to the housing of the differential gearing and the housing carries with it the internal gears 15. The spiral gears 11 and 12 are right and left hand gears or in other words they have right and left hand threads. Therefore on account of the holding back action of the axles or driven shafts 2 and 3 due to the traction of the driving wheels on the ground, the spiral gears 11 and 12, when the vehicle is moving in a forward direction, are crowded toward each other by the action of the internal gears, causing the clutch faces 21 and 22 to engage the clutch faces 19 and 20 and crowd the clutch members 17 and 18 against each other along their meeting faces. This imparts motion to both sections 3' and 4 of the countershaft. Should a turn be made by the vehicle, one of the spiral gears 11 and 12, according to the direction in which the turn is made, will move outwardly away from the respective clutch member 17 or 18, and while one of the spiral gears will be left free and disengaged, the other spiral gear will be brought into clutched engagement with the respective clutch face 29 or 30 as the case may be, whereupon the drive will be through the spiral gear which has moved away from the center of the differential gearing and the respective countershaft section 3' or 4 as the case may be.

In backing the vehicle, both of the spiral gears 11 and 12 will be moved outwardly by the action of the internal gears 15, causing the clutch face 27 to engage the clutch face 29 and causing the clutch face 28 to engage the clutch face 30. In making a turn while backing the vehicle, one set of the last named clutch faces will be disengaged by the respective spiral gear moving inwardly, such inward movement of the last named spiral gear being caused by the added speed of the driving wheel on the respective driven shaft section 2 or 3 as the case may be.

Thus the differential gearing automatically takes care of itself and compensates for any difference in the ratio of speed of the driving wheels of a motor vehicle. The housing hereinabove described is admirably adapted to contain and retain for a long period of time oil, grease or any other lubricating material for the proper lubrication of the working parts of the mechanism hereinabove described.

The parts 11 and 12 constitute in fact shiftable driving clutch members, the member 11 having two oppositely facing clutch faces 22 and 28. The so called internal gears 15 constitute in fact members which operate to shift the said shiftable clutch members 11 and 12 into and out of engagement with the other clutch members arranged at opposite sides of said shiftable driving clutch members. Each of the shiftable driving clutch members 11 and 12 is limited as to the movements thereof longitudinally of the respective countershaft section by the clutch member 24 or 25 thereof coming in contact with the adjacent face of the members 15 which as previously stated have a fixed relation to and are carried by the surrounding housing.

I claim:

1. In differential gearing, the combination of a driving shaft, a sectional driven countershaft, driven clutch members carried by the countershaft sections, automatically shiftable driving clutch members movable longitudinally of the countershaft sections, and means actuated by said driving shaft operating to move said shiftable clutch members into and out of engagement with the first named clutch members, said means embodying a rotatable housing surrounding the countershaft sections, and clutch shifting members carried by said housing and engaging said shiftable clutch members.

2. In differential gearing, the combination of a driving shaft, a sectional driven countershaft, driven clutch members carried by the countershaft sections, automatically shiftable driving clutch members movable longitiudnally of the countershaft sections, and means actuated by said driving shaft operating to move said shiftable clutch members into and out of engagement with the first named clutch members, said means embodying a rotatable housing surrounding the countershaft sections, and clutch shifting members carried by said housing and having a threaded engagement with said shiftable clutch members.

3. In a differential gearing, the combination of a driving shaft, a sectional driven countershaft, driven clutch members carried by the countershaft sections, each countershaft section having two of such clutch members arranged in spaced relation to each other with their clutch faces facing each other, automatically shiftable driving clutch members movable longitudinally of the countershaft sections, and means actuated by said driving shaft operating to move said shiftable clutch members into and out of engagement with the first named clutch members, said means embodying a rotatable housing surrounding the countershaft sections, and clutch shifting members carried by said housing and engaging said shiftable clutch members.

4. In differential gearing, the combination of a driving shaft, a sectional driven countershaft, driven clutch members carried by the countershaft sections, automatically shiftable driving clutch members movable longitudinally of the countershaft sections, and means actuated by said driving shaft operating to move said shiftable clutch members into and out of engagement with the first named clutch members, said means embodying a rotatable housing surrounding the countershaft sections and geared to and actuated by said driving shaft, and clutch shifting members carried by said housing and engaging said shiftable clutch members.

5. In differential gearing, the combination of a driving shaft, a sectional driven countershaft, driven clutch members carried by the countershaft sections, automatically shiftable driving clutch members movable longitudinally of the countershaft sections, means actuated by said driving shaft operating to move said shiftable clutch members into and out of engagement with the first named clutch members, and a center supporting shaft serving to hold the adjacent ends of the countershaft sections in alinement.

In testimony whereof I affix my signature.

ARTHUR C. RUDEN.